H. Yost,
Washing Machine,
N° 20,123.  Patented Apr. 27, 1858.
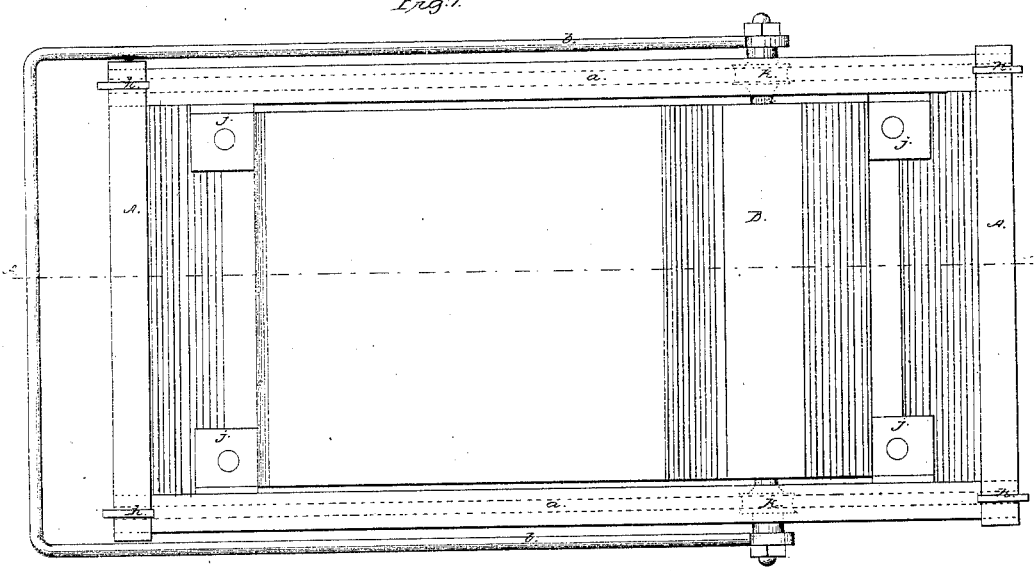
Fig. 1.
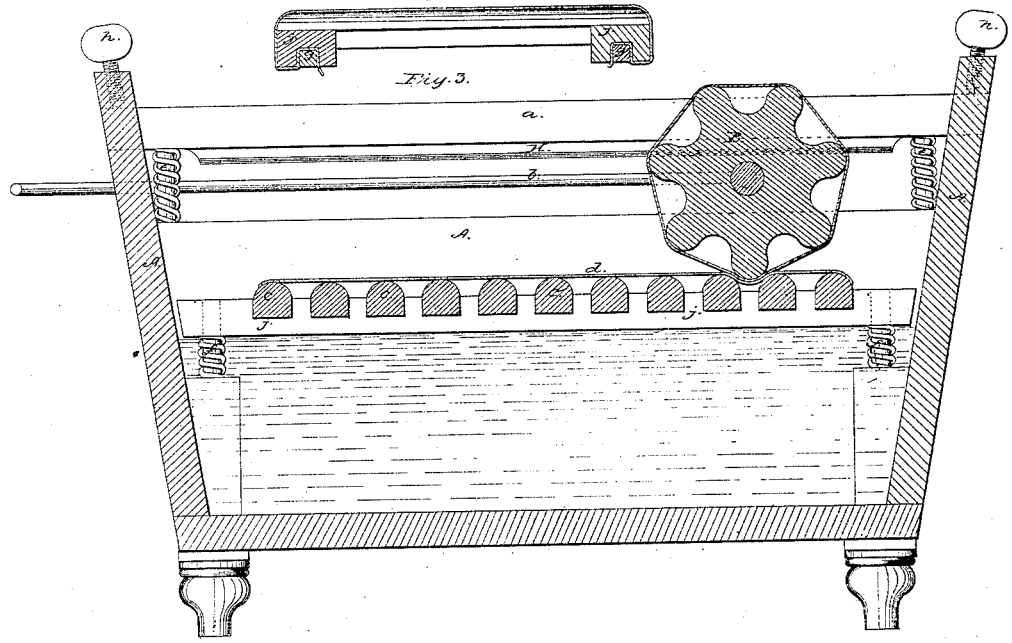
Fig. 2.
Fig. 3.

UNITED STATES PATENT OFFICE.

HENRY YOST, OF ST. LOUIS, MISSOURI.

WASHING-MACHINE.

Specification of Letters Patent No. 20,123, dated April 27, 1858.

*To all whom it may concern:*

Be it known that I, HENRY YOST, of the city of St. Louis and State of Missouri, have invented a new and Improved Washing-Machine; and I do hereby declare that the following is a full, clear, and exact description of the same, reference being had to the annexed drawing, making part of this specification, in which—

Figure 1 is a plan, Fig. 3 a longitudinal vertical section through A′ A′, and Fig. 2 is a part of the machine to be hereinafter explained.

Similar letters of reference represent corresponding parts on the different figures.

My invention consists in fixing in a washing tub, at or near the surface of the water, in the said tub, an open rubbing board or rack, on spring bearings, and in combining with the said rubbing rack a revolving rubber which is to be fluted and covered with canvas, the axis to be fixed against adjustable bearings and so arranged that the said rubber can be made to travel to and fro on the said rack, whereby the said rubber in passing over an article placed on the said rack to be washed will cause the said rack to rise and fall to and from the surface of the water, so that the dirt will be carried off by the action of the water as fast as it is loosened by the action of the rubber aforesaid.

To enable others skilled in that class of the arts to which this belongs to make and use my invention, I will proceed to describe its construction and operation as follows:

A A A is the tub.

$j$ $j$ is the rubber rack and $f$ $f$ are spring bearings upon which the said rack is fixed, the said springs being coiled around pins which reach through the rack, whereby it is held in a given position.

C C C are the cross bars composing the rack, and $d$ is a canvas with which it is covered.

B is the revolving rubber, which is fluted and covered with canvas as shown.

$b$ $b$ is a shaft or handle, which is connected to the axis of the rubber, whereby it is moved to and fro on the rack $j$.

K is a wheel (shown in dotted lines) having a concave periphery, which works on the guide piece H which is fixed against the bottom side of the rail $a$. This rail is held in position by means of the two pins $e$ $e$, around which springs are coiled, upon which the said rail rests, and against the top of this rail the adjusting screws $n$ $n$ are made to act, whereby the said rail can be set down on the axis of the said rubber, so as to make it bear as hard on the rubber rack as circumstances may require, the springs around the pins $e$ $e$ being placed there merely to hold up the alternate ends of the rail when it is unsupported by the axis of the rubber.

Fig. 2 is a transverse section through the rack $j$ showing how the canvas is drawn over and secured to it. It will be seen that grooves are cut in the pieces $j$ $j$ and that the canvas is secured by means of the strips $g$ $g$ which are secured in their places after the canvas has been drawn across the groove as shown.

All the washing machines (wherein the rubbing process is used) with which I am acquainted operate on one and the same principle, which consists in first soaping the clothes, then putting them in the machine, and then throwing water enough on them to wet them well, and then rubbing them in the water until it is thought the dirt is loose. The clothes are then taken out and rinsed. Now it is evident that in such an operation as the one described the rubale body of water is kept constantly in motion, whereby all the dirt which comes from the clothes is held in solution by the water during the operation, so that the dirt instead of being washed out of the clothes entirely is merely taken out of one part and put in the other, or in other words, all and every part of the clothes are made equally dirty, so that the washing is really done after the clothes are taken out of the machine. But my invention is designed to overcome the objections above referred to, and it will be seen by an examination of the drawing that the tub is filled with water up to the bottom of the rubber rack $j$. Now let a piece of clothing be soaked and spread on the rack and let the operator compress the said rack so as to bring the water over the article and saturate it with water—that is the article of clothing laid on the rack—and then let the rubber be moved back and forth over it, whereby a stiff suds will be formed and a part of the dirt rubbed loose. Now let the rack be again compressed until the water rises over it; and by this means the dirt that is loosened will be washed away. The clothes may then be again soaped and the operation repeated until the clothes are clean. Now it will be seen that only the top or surface of the water is disturbed during this operation, so that the dirt as fast as it is washed off of the clothes will settle to the bottom of the tub, thus leaving the surface of the water comparatively clean for each succeeding compression of the rack, whereby the dirt is washed away from the clothes, after being loosened, with comparatively clean water. This yielding rack with the aid of the canvas around it and the rubber B will also prevent any buttons from being broken off of the clothing and will prevent the clothing from being injured in any way, as I have found by experiment that the most delicate fabric may be washed in the machine without injury.

I claim as my invention—

The traversing rubber, in connection with the yielding rack $j$, over the surface of the water in the manner described.

HENRY YOST.

Witnesses:
 JOHN A. SHAW,
 CLARENCE DELAFIELD.